United States Patent Office 3,000,542
Patented Sept. 19, 1961

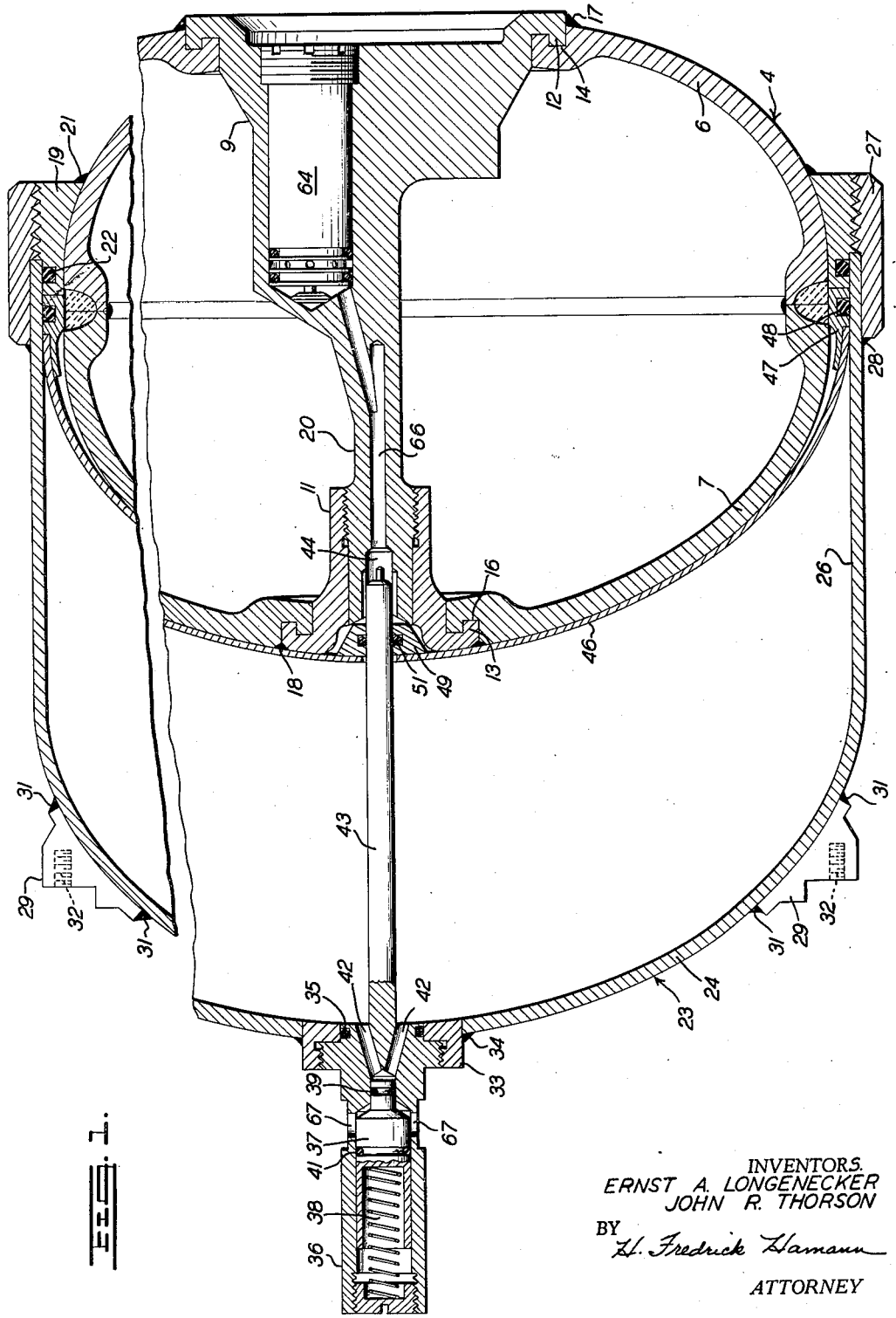

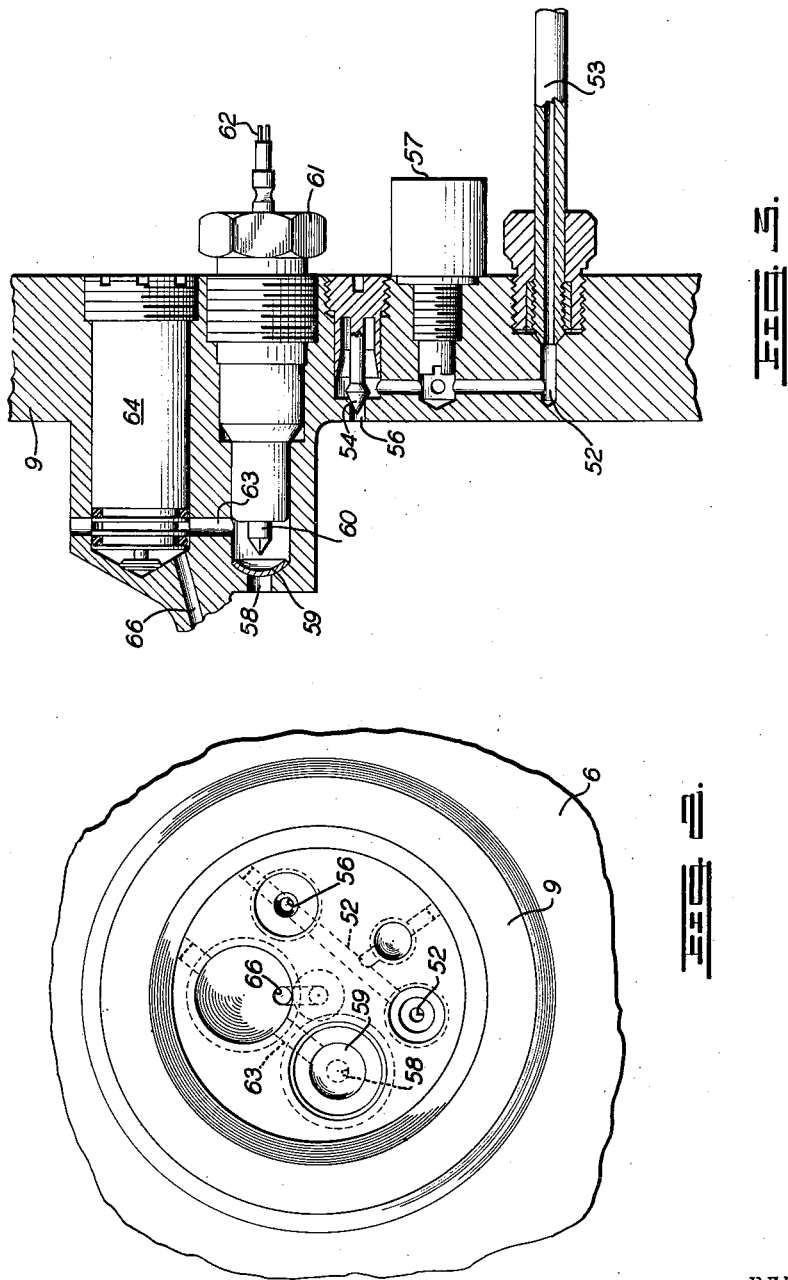

3,000,542
HYDRO-PNEUMATIC ACCUMULATOR
Ernst A. Longenecker, Jackson, Mich., and John R. Thorson, Takoma Park, Md., assignors to ACF Industries, Incorporated, New York, N.Y., a corporation of New Jersey
Filed Feb. 26, 1959, Ser. No. 795,773
5 Claims. (Cl. 222—80)

This invention relates to a hydro-pneumatic accumulator adapted for use in the propulsion system of a guided missile and, more particularly, to a piston-type accumulator wherein one fluid under pressure is utilized as potential energy for performing useful work through the medium of another fluid. The accumulator is also adapted for use in moving a large volume of oil under high pressure to various units in power systems of military aircraft to insure operation of hydraulic equipment in the event of pump failure.

An object of the present invention resides in the provision of an accumulator provided with gas and liquid chambers and a piston operable to discharge liquid from the liquid chamber responsive to release of pressurized gas from the gas chamber.

Another object of the invention resides in the provision of a piston type accumulator provided with means to prevent leakage of pressurized gas from the gas chamber into the liquid chamber.

A further object is to provide a piston type accumulator wherein the liquid is stored at low pressure in the liquid chamber to prevent damage to a plane or its occupants in the event of rupture of the liquid chamber by a bullet.

Another object is to provide a piston type accumulator which is relatively light in weight and capable of moving a large volume of liquid under high gas pressure.

Another object is to provide an accumulator embodying a relatively light weight, cup-shaped piston drawn from sheet metal and provided with O-ring gaskets for sealing engagement with a guide stem and the inner periphery of the liquid chamber.

Another object is to provide an accumulator embodying an ellipsoidal gas container mounted within a cup-shaped container serving as a low pressure chamber to receive a liquid, the gas container comprising a pair of cup-shaped members welded together at their inner portions and secured together at their crown sections by threaded adapters.

Another object is to provide an accumulator in which the gas container is provided with inlet and outlet passages provided with closure means to prevent leakage of gas from the container, said outlet passage leading into a space between the container and a piston conforming in contour to the container.

Another object is to provide an accumulator embodying an explosive trigger mechanism for rupturing the outlet passage closure means to permit a flow of pressurized gas against one side of the piston under control of a pressure regulator.

Another object of the invention is to provide a piston type accumulator which is relatively simple and inexpensive to manufacture, and reliable in operation.

The invention embodies other novel features, details of construction and arrangement of parts which are hereinafter set forth in the specification and claims and illustrated in the accompanying drawings, forming part thereof, wherein:

FIG. 1 is a longitudinal section illustrating a piston type accumulator embodying features of the invention.

FIG. 2 is a fragmentary end elevation illustrating the arrangement of passageways and openings provided in the outer adapter.

FIG. 3 is a schematic view in section illustrating the outer adapter and the parts mounted thereon.

Referring now to the drawings for a better understanding of the invention, the hydro-pneumatic accumulator is shown as comprising a container 4 of ellipsoidal shape adapted to contain a gas under high pressure. The container is adapted to be inexpensively formed from a pair of deep drawn metallic cup-shape members 6 and 7 secured together at their rims by a continuous weld 8 and provided with coaxial openings in their crown sections to receive adapters 9 and 11.

The adapters 9 and 11 are formed with annular flanges 12 and 13, respectively, for snug seating engagement within annular grooves 14 and 16 provided in the members 6 and 7, respectively, said adapters being secured to their respective members by continuous welds 17 and 18, respectively. The outer adapter 9 is formed with a stem 20 for threaded engagement within the inner adapter 11 to resist internal gas pressure tending to separate the container members 6 and 7. An externally threaded ring 19 is secured to the container member 6 adjacent its rim portion by means of a continuous weld 21, the ring having an annular groove therein to receive an O-ring gasket 22.

The ellipsoidal gas container 4 is mounted within the open end of a cup-shape container 23 which is preferably deep drawn from the blank of sheet metal to provide an arcuate crown section 24 merging with a cylindrical side wall section 26. An internally threaded ring 27 surrounds the rim portion of the container 23 and is continuously welded thereto at 28. During assembly, the ring 19 on the container 4 is threaded into the ring 27 to dispose the O-ring gasket 22 in annular engagement against the inner surface of the side wall 26. If desired, mounted brackets 29 may be welded at 31 to the container 23 and provided with threaded apertures 32 to receive mounting screws.

The container 23 is formed with an axial opening to receive an internally threaded nipple 33 which is continuously welded at 34 to the container. A check valve housing 36 is threaded into the nipple 33 and provided with an O-ring gasket 35 to prevent leakage therebetween. A valve member 37 is mounted for reciprocative movement within the housing 36 and biased toward its closed position by a spring 38. O-ring gaskets 39 and 41 are provided on the valve member 37 for engagement against inner cylindrical surfaces on the housing. The housing 36 is formed with outlet ports 42 for the container 23 which are normally closed by the valve member 37. A guide pin 43 provided on the valve housing 36 extends axially of the containers 6 and 23 into a bore 44 formed in the adapter stem 20.

A cup-shape piston body 46 is preferably drawn from a blank of sheet metal to conform to the contours of the outer side of the container member 7 and the inner surface of the crown section 24. A metal ring 47 is brazed or otherwise secured to the rim portion of the piston body 46 and formed with an annular groove to receive an O-ring gasket 48. The piston body 46 is provided with an axial opening and a bearing 49 to receive the guide stem 43, the bearing being secured to said body by brazing or welding and provided with an annular groove to receive an O-ring gasket 51.

The outer adapter 9 is provided with a gas inlet passage 52 adapted to be connected to a source of pressurized gas by a conduit 53 to fill the gas container 4 prior to insertion of a valve 54 into the port 56. After the container 4 has been filled with gas under pressure, the valve 54 is inserted to close the port 56. A pressure gage 57 may be inserted in the passage 52 to visually indicate the gas pressure prior to closing of the port 56.

The outer adapter 9 is provided with a gas release port 58 which is normally closed by a metal disk 59 soldered to the adapter and adapted to be ruptured to permit escape of the gas by means of a plunger 60 in a gun 61 containing an explosive charge adapted to be ignited by an electric current passing through conduits 62.

Upon rupture of the disk 59, gas flows through the port 58, passage 63, pressure regulator 64, passage 66, and bore 44 into the space between the gas container 4 and piston 46 to move the latter axially toward the crown section 24 of the liquid container 23 to force the liquid therein outwardly through the ports 42. The check valve 37 is thus moved to its open position to discharge the liquid through ports 67 to the point of use.

After discharge of the liquid from the accumulator, the piston is returned to its position adjacent the gas container, and a new disk 59 is provided in place of the ruptured disk. The container 23 is then refilled with liquid, and the valve 54 is withdrawn to permit refilling of the container 4 with gas, after which the valve is moved into position to close the port 56.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a hydro-pneumatic accumulator, a cup-shape liquid container having an arcuate crown section merging with a cylindrical side wall, an ellipsoidal-shape gas container mounted on the rim portion of said liquid container, a cup-shape piston mounted for reciprocative movement within said liquid container between said gas container and said crown section, a guide stem extending through said piston and supported at its ends by said crown section and gas container, a check valve on said crown section to yieldably resist passage of liquid outwardly from said liquid container, means to release pressurized gas from said gas container to move said piston toward said crown section, said gas container comprising a pair of cup-shape members welded together at their rim portions, adapters secured to their respective cup-shape members and secured to each other, one of said adapters having a gas inlet and outlet passages, and a valve to close said inlet passage.

2. In a hydro-pneumatic accumulator, a cup-shape liquid container having an arcuate crown section merging with a cylindrical side wall, an ellipsoidal-shape gas container mounted on the rim portion of said liquid container, a cup-shape piston mounted for reciprocative movement within said liquid container between said gas container and said crown section, a guide stem extending through said piston and supported at its ends by said crown section and gas container, a check valve on said crown section to yieldably resist passage of liquid outwardly from said liquid container, means to release pressurized gas from said gas container to move said piston toward said crown section, said gas container comprising a pair of cup-shape members welded together at their rim portions, adapters secured to their respective cup-shape members and secured to each other, one of said adapters having a gas inlet and outlet passages, and a valve to close said inlet passage, and a pressure regulator controlling the flow of gas through said outlet passage.

3. In a hydro-pneumatic accumulator, a cup-shape liquid container having an arcuate crown section merging with a cylindrical side wall, an ellipsoidal-shape gas container mounted on the rim portion of said liquid container, a cup-shape piston mounted for reciprocative movement within said liquid container between said gas container and said crown section, a guide stem extending through said piston and supported at its ends by said crown section and gas container, a check valve on said crown section to yieldably resist passage of liquid outwardly from said liquid container, means to release pressurized gas from said gas container to move said piston toward said crown section, said gas container comprising a pair of cup-shape members welded together at their rim portions, adapters secured to their respective cup-shape members and secured to each other, one of said adapters having a gas inlet and outlet passages, a valve to close said inlet passage, a pressure regulator controlling the flow of gas through said outlet passage, said means comprising a rupturable disk in said outlet passage, and means operable to rupture said disk.

4. In a hydro-pneumatic accumulator, a cup-shape liquid container having an arcuate crown section merging with a cylindrical side wall, an ellipsoidal-shape gas container mounted on the rim portion of said liquid container, a cup-shape piston mounted for reciprocative movement within said liquid container between said gas container and said crown section, a guide stem extending through said piston and supported at its ends by said crown section and gas container, a check valve on said crown section to yieldably resist passage of liquid outwardly from said liquid container, means to release pressurized gas from said gas container to move said piston toward said crown section, said gas container comprising a pair of cup-shape members welded together at their rim portions, adapters secured to their respective cup-shape members and secured to each other, one of said adapters having a gas inlet and outlet passages, a valve to close said inlet passage, a pressure regulator controlling the flow of gas through said outlet passage, said means comprising a rupturable disk in said outlet passage, and means including a gun having a plunger therein operable to rupture said disk.

5. In a hydro-pneumatic accumulator, a cup-shape liquid container having an arcuate crown section merging with a cylindrical side wall, a gas container mounted on the rim portion of said liquid container, a cup-shape piston mounted for reciprocative movement within said liquid container between said gas container and said crown section, a guide stem extending through said piston and supported at its ends by said crown section and gas container, a check valve on said crown section to yieldably resist passage of liquid outwardly from said liquid container, means to release pressurized gas from said gas container to move said piston toward said crown section, said gas container comprising a pair of cup-shape members welded together at their rim portions, adapters secured to their respective cup-shape members and secured to each other, one of said adapters having gas inlet and outlet passages, and a valve to close said inlet passage, and a pressure regulator controlling the flow of gas through said outlet passage.

References Cited in the file of this patent

UNITED STATES PATENTS

| | | |
|---|---|---|
| 2,273,125 | McFarland | Feb. 17, 1942 |
| 2,459,743 | Trainer et al. | Jan. 18, 1949 |
| 2,479,570 | Hayner et al. | Aug. 23, 1949 |
| 2,605,763 | Smoot | Aug. 5, 1952 |
| 2,752,067 | Kohl et al. | June 26, 1956 |
| 2,847,148 | Altseimer | Aug. 12, 1958 |